(12) United States Patent  
Kishimoto et al.

(10) Patent No.: US 11,269,345 B2
(45) Date of Patent: Mar. 8, 2022

(54) VEHICLE CONTROL SYSTEM

(71) Applicant: HONDA MOTOR CO., LTD., Tokyo (JP)

(72) Inventors: Takashi Kishimoto, Saitama (JP); Yoshifumi Nakamura, Saitama (JP); Noriyuki Imaeda, Saitama (JP); Jun Ishii, Tokyo (JP); Daiki Higuchi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/112,064

(22) Filed: Dec. 4, 2020

(65) Prior Publication Data

US 2021/0173406 A1 Jun. 10, 2021

(30) Foreign Application Priority Data

Dec. 9, 2019 (JP) .............................. JP2019-222120

(51) Int. Cl.
*G01C 22/00* (2006.01)
*G05D 1/02* (2020.01)
*H04N 5/77* (2006.01)
*G06V 20/56* (2022.01)

(52) U.S. Cl.
CPC ......... *G05D 1/0246* (2013.01); *G06V 20/588* (2022.01); *H04N 5/77* (2013.01)

(58) Field of Classification Search
CPC ............. G05D 1/0246; G06K 9/00791; G06K 9/00798; H04N 5/77
USPC ................... 701/23, 25, 27, 28, 41
See application file for complete search history.

(56) References Cited

FOREIGN PATENT DOCUMENTS

| CN | 110349405 A | * | 10/2019 |
| JP | 5650444 B2 | | 1/2015 |
| JP | 6592051 B2 | * | 10/2019 |

* cited by examiner

*Primary Examiner* — Robert Chevalier
(74) *Attorney, Agent, or Firm* — Armstrong Teasdale LLP

(57) ABSTRACT

A vehicle control system includes a control device configured to execute specific automatic driving control; an image capturing device configured to capture a surrounding image of a vehicle; a display device configured to display the surrounding image; and a recording device configured to record the surrounding image. The control device includes: a first determining unit configured to determine whether the vehicle is present on a road where the specific automatic driving control is executable; and a second determining unit configured to determine whether a request to display the surrounding image is present. In a case where the first determining unit determines that the vehicle is present on the road where the specific automatic driving control is executable and the second determining unit determines that the request to display the surrounding image is absent, the recording device records the surrounding image.

10 Claims, 4 Drawing Sheets

X: area where recording device records surrounding image
Y: areas where recording device does not record surrounding image

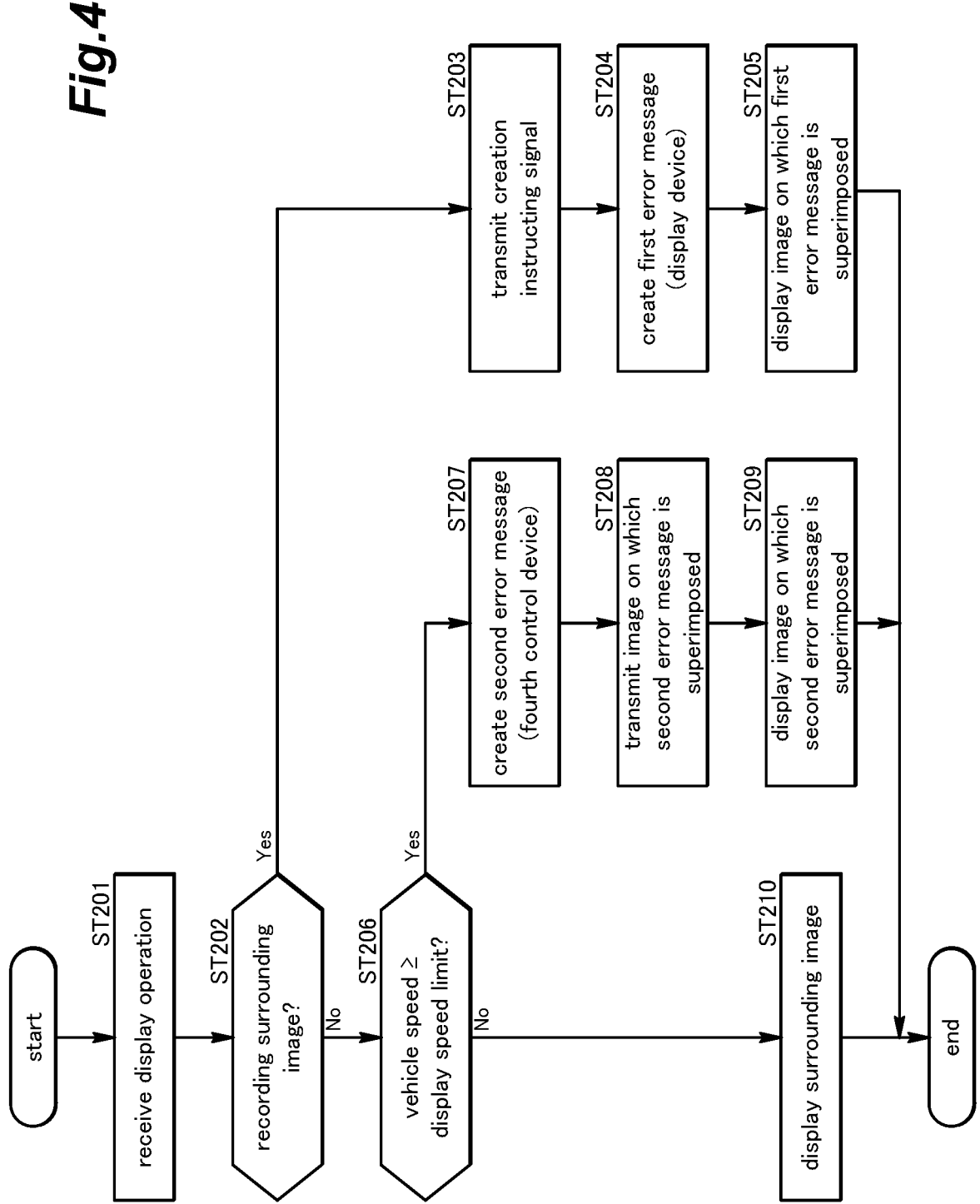

VEHICLE CONTROL SYSTEM

TECHNICAL FIELD

The present invention relates to a vehicle control system.

BACKGROUND ART

Conventionally, a vehicle control system includes an image capturing device configured to capture a surrounding image of a vehicle and a recording device configured to record the surrounding image of the vehicle (for example, Japanese Patent No. 5650444).

In a case where such a vehicle control system is configured to execute automatic driving control of the vehicle, it is desirable that the surrounding image of the vehicle is recorded on a road where specific automatic driving control (for example, the automatic driving control with a relatively high degree of automation) is executable so that the cause of the event that has occurred with regard to the vehicle can be easily identified. However, if the surrounding image of the vehicle is recorded unlimitedly in a vehicle control system configured such that one of the recording and the display of the surrounding image of the vehicle is executed selectively, the display of the surrounding image of the vehicle may be prevented by the recording of the surrounding image of the vehicle.

SUMMARY OF THE INVENTION

In view of such a problem of the prior art, a primary object of the present invention is to record a surrounding image of a vehicle at an appropriate timing without preventing a display device from displaying the surrounding image of the vehicle, in a vehicle control system configured to execute automatic driving control of the vehicle.

To achieve such an object, one embodiment of the present invention provides a vehicle control system (1) including: a control device (14) configured to execute specific automatic driving control of a vehicle; an image capturing device (45) configured to capture a surrounding image of the vehicle; a display device (48) configured to display the surrounding image; and a recording device (21) configured to record the surrounding image, wherein the control device includes: a first determining unit (51) configured to determine whether the vehicle is present on a road where the specific automatic driving control is executable; and a second determining unit (52) configured to determine whether a request to display the surrounding image on the display device is present, and in a case where the first determining unit determines that the vehicle is present on the road where the specific automatic driving control is executable and the second determining unit determines that the request to display the surrounding image on the display device is absent, the recording device records the surrounding image.

According to this arrangement, it is possible to record the surrounding image of the vehicle at an appropriate timing without preventing the display device from displaying the surrounding image of the vehicle.

In the above arrangement, preferably, in a case where the first determining unit determines that the vehicle is present on the road where the specific automatic driving control is executable and the second determining unit determines that the request to display the surrounding image on the display device is absent, the recording device records the surrounding image regardless of whether the specific automatic driving control is being executed.

According to this arrangement, it is possible to record not only the surrounding image of the vehicle captured during the specific automatic driving control but also the surrounding image of the vehicle captured before the start of and after the end of the specific automatic driving control. Accordingly, it is possible to easily identify the cause of the event that has occurred before the start of and after the end of the specific automatic driving control.

In the above arrangement, preferably, in a case where the vehicle is present in a main lane of an exclusive road for automobiles, the first determining unit determines that the vehicle is present on the road where the specific automatic driving control is executable, and in a case where the vehicle is not present in the main lane of the exclusive road for the automobiles, the first determining unit determines that the vehicle is not present on the road where the specific automatic driving control is executable.

According to this arrangement, the surrounding image of the vehicle can be recorded in a case where the specific automatic driving control is executed in the main lane of the exclusive road for the automobiles.

In the above arrangement, preferably, in a case where a shift range of the vehicle is set to a reverse range, the second determining unit determines that the request to display the surrounding image on the display device is present, and in a case where the shift range of the vehicle is not set to the reverse range, the second determining unit determines that the request to display the surrounding image on the display device is absent.

According to this arrangement, the recording device can stop recording the surrounding image of the vehicle and the display device can display the surrounding image of the vehicle in a state where the shift range of the vehicle is set to the reverse range. Accordingly, an occupant can easily check a surrounding situation of the vehicle based on the surrounding image of the vehicle when the vehicle reverses.

In the above arrangement, preferably, the vehicle control system further includes a communication device (17) configured to receive the surrounding image from the image capturing device and to transmit the received surrounding image to the display device, wherein the recording device is configured to record the surrounding image received from the communication device.

According to this arrangement, it is possible to record the surrounding image by using a simple configuration.

In the above arrangement, preferably, the vehicle control system further includes a display switch (49) configured to receive a display operation of the surrounding image, wherein in a case where the display switch receives the display operation, the display device displays the surrounding image on condition that a vehicle speed is less than a prescribed display speed limit and the recording device is not recording the surrounding image, and in the case where the display switch receives the display operation, the display device displays an error message indicating that the surrounding image cannot be displayed on condition that the vehicle speed is equal to or more than the display speed limit or the recording device is recording the surrounding image.

According to this arrangement, the display device can display the surrounding image of the vehicle at an appropriate timing. Also, in a case where the surrounding image of the vehicle cannot be displayed, it is possible to inform the occupant so.

In the above arrangement, preferably, in the case where the display switch receives the display operation, the communication device creates the error message on condition that the vehicle speed is equal to or more than the display speed limit, and in the case where the display switch receives the display operation, the display device creates the error message on condition that the recording device is recording the surrounding image.

According to this arrangement, it is possible to prevent the error message created by the communication device from appearing on the surrounding image recorded by the recording device. Accordingly, it is possible to easily identify the cause of the event that has occurred with regard to the vehicle based on the surrounding image.

In the above arrangement, preferably, the display device is connected to the communication device via a digital communication line, the recording device is connected to the communication device via an analog communication line, and the communication device is configured to selectively transmit the surrounding image to one of the display device and the recording device.

According to this arrangement, it is possible to transmit the surrounding image to the display device and the recording device by using a simple configuration.

In the above arrangement, preferably, the vehicle control system further includes a vehicle sensor (8) configured to detect a vehicle state, wherein the control device is configured to record vehicle data in an inside area thereof regardless of determination results of the first determining unit and the second determining unit, the vehicle data including the vehicle state.

According to this arrangement, the control device can record the vehicle data even when the recording device is not recording the surrounding image. Accordingly, it is possible to easily identify the cause of the event that has occurred in a state where the recording device is not recording the surrounding image.

In the above arrangement, preferably, the image capturing device includes plural cameras (46) configured to capture images of a front side, a rear side, a left side, and a right side of the vehicle, respectively.

According to this arrangement, it is possible to accurately recognize the surrounding situation of the vehicle based on the surrounding image of the vehicle captured by the image capturing device.

Thus, according to the above arrangements, it is possible to record a surrounding image of a vehicle at an appropriate timing without preventing a display device from displaying the surrounding image of the vehicle, in a vehicle control system configured to execute automatic driving control of the vehicle.

BRIEF DESCRIPTION OF THE DRAWING(S)

FIG. 4 is a flowchart showing display control of the surrounding image.

DESCRIPTION OF THE PREFERRED EMBODIMENT(S)

<The Vehicle Control System 1>

In the following, a vehicle control system 1 according to an embodiment of the present invention will be described with reference to the drawings. The vehicle control system 1 is mounted on a vehicle 2 such as a four-wheeled automobile, and is configured to control the vehicle 2.

Figure 1:
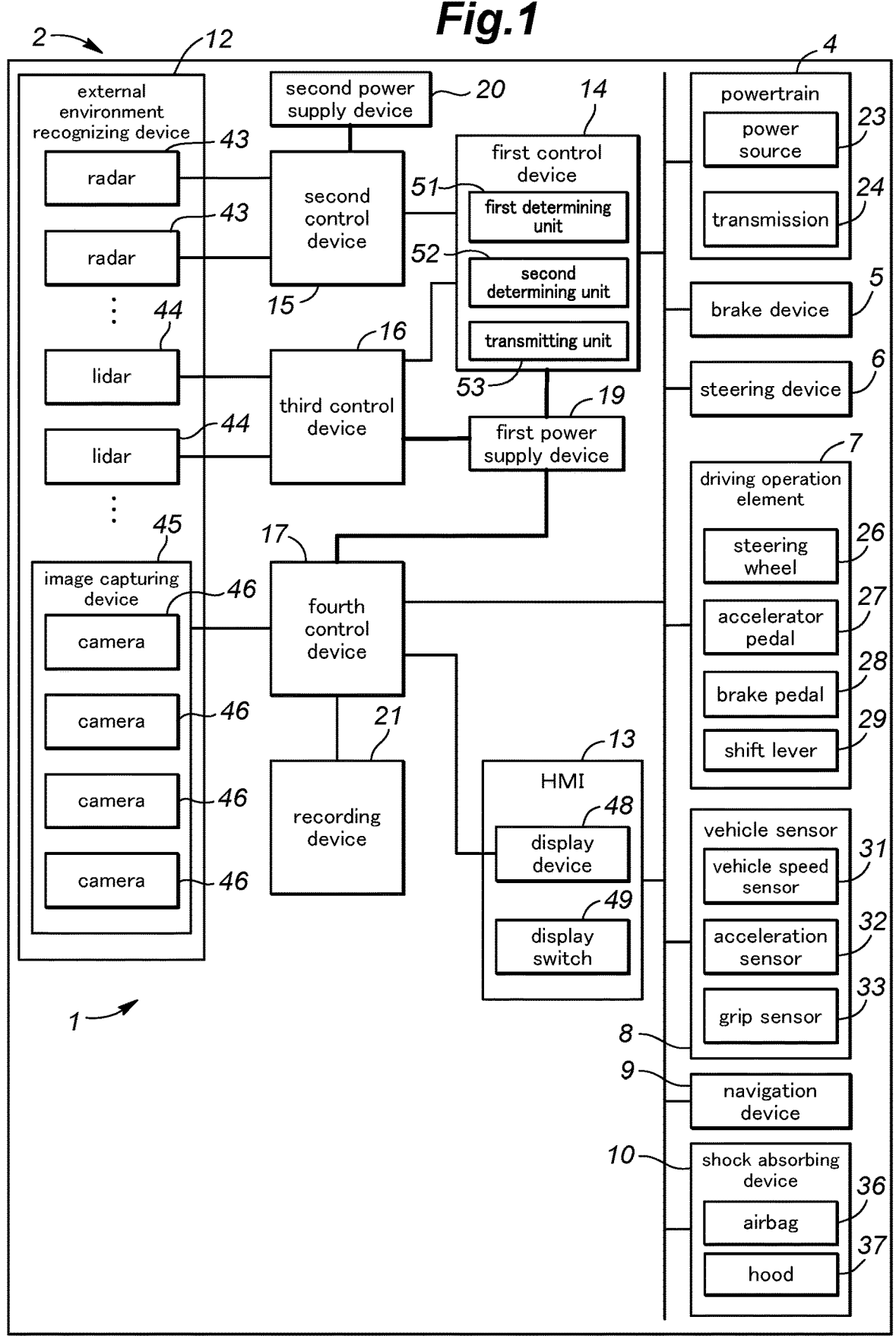
FIG. 1 is a block diagram of a vehicle control system according to an embodiment.

With reference to FIG. 1, the vehicle control system 1 includes a powertrain 4, a brake device 5, a steering device 6, a driving operation element 7, a vehicle sensor 8, a navigation device 9, a shock absorbing device 10, an external environment recognizing device 12, a Human Machine Interface 13 (HMI), first to fourth control devices 14 to 17, first and second power supply devices 19 and 20, and a recording device 21. In the following, the above-mentioned components of the vehicle control system 1 will be described one by one.

The powertrain 4 is a device configured to apply a driving force to the vehicle 2. For example, the powertrain 4 includes a power source 23 and a transmission 24. The power source 23 includes at least one of an internal combustion engine such as a gasoline engine or a diesel engine and an electric motor.

The brake device 5 is a device configured to apply a brake force to the vehicle 2. For example, the brake device 5 includes a brake caliper configured to press a pad against a brake rotor, and an electric cylinder configured to supply an oil pressure to the brake caliper.

The steering device 6 is a device configured to change a steering angle of wheels. For example, the steering device 6 includes a rack-and-pinion mechanism configured to steer (turn) the wheels, and an electric motor configured to drive the rack-and-pinion mechanism.

The driving operation element 7 is an operation element provided inside a vehicle cabin and configured to receive a driving operation of the vehicle 2 by an occupant. For example, the driving operation element 7 includes a steering wheel 26 configured to receive a steering operation of the vehicle 2, an accelerator pedal 27 configured to receive an acceleration operation of the vehicle 2, a brake pedal 28 configured to receive a brake operation of the vehicle 2, a shift lever 29 configured to receive an operation for switching a shift range of the vehicle 2. For example, the shift range of the vehicle 2 includes a forward range, a reverse range, a neutral range, a parking range, and the like. The forward range is a shift range to transmit a driving force of the power source 23 to the wheels and thus to move the vehicle 2 forward. The reverse range is a shift range to transmit the driving force of the power source 23 to the wheels and thus to reverse the vehicle 2. The neutral range is a shift range in which the wheels are rotatable and the driving force of the power source 23 is not transmitted to the wheels. The parking range is a shift range in which the rotation of the wheels is restricted and the driving force of the power source 23 is not transmitted to the wheels.

The vehicle sensor 8 is a sensor configured to detect various vehicle states (namely, various states of the vehicle 2). For example, the vehicle sensor 8 includes a vehicle speed sensor 31 configured to detect the vehicle speed of the vehicle 2, an acceleration sensor 32 configured to detect the acceleration of the vehicle 2, and a grip sensor 33 configured to detect that the occupant grips the steering wheel 26.

The navigation device 9 is a device configured to acquire the current position of the vehicle 2 and to provide route guidance to a destination or the like. The navigation device 9 includes a GPS receiving unit and a map storing unit. The GPS receiving unit is configured to identify the current position (latitude and longitude) of the vehicle 2 based on a signal received from an artificial satellite (positioning satellite). The map storing unit includes a flash memory, a hard disk, and the like, and is configured to store map information.

The shock absorbing device 10 is a device configured to absorb a shock caused by a collision (hereinafter referred to as "vehicle collision") between the vehicle 2 and an object outside the vehicle 2 (for example, another vehicle, an obstacle, or a pedestrian). For example, the shock absorbing device 10 includes an airbag 36 and a hood 37 (a pop-up hood). For example, the airbag 36 is provided in the steering wheel 26 and/or a passenger seat. The airbag 36 is deployed at occurrence of the vehicle collision, thereby reducing an impact on the occupant. For example, the hood 37 is configured to cover the power source 23 from above. The hood 37 is partially lifted at the occurrence of the vehicle collision, thereby forming a space between the hood 37 and the power source 23 and reducing an impact on the pedestrian.

The external environment recognizing device 12 is a device configured to detect the object outside the vehicle 2. For example, the external environment recognizing device 12 includes plural radars 43, plural lidars 44, and an image capturing device 45. Each radar 43 emits radio waves such as millimeter waves around the vehicle 2 and captures the reflected radio waves, thereby detecting a position of the object outside the vehicle 2 (the distance between the vehicle 2 and the object outside the vehicle 2 and the direction of the object outside the vehicle 2). Each lidar 44 emits light such as infrared rays around the vehicle 2 and captures the reflected light, thereby detecting the position of the object outside the vehicle 2. The image capturing device 45 is a device configured to capture a surrounding image of the vehicle 2 (hereinafter simply referred to as "the surrounding image"). The surrounding image captured by the image capturing device 45 is a moving image. In another embodiment, the surrounding image captured by the image capturing device 45 may be a static image. The image capturing device 45 includes four cameras 46 configured to capture images of a front side, a rear side, a left side, and a right side of the vehicle 2, respectively. Accordingly, it is possible to accurately recognize a surrounding situation of the vehicle 2 based on the surrounding image captured by the image capturing device 45.

The HMI 13 is an input/output device configured to notify the occupant of various pieces of information and to receive an input operation by the occupant. For example, the HMI 13 includes a display device 48 and a display switch 49. The display device 48 includes a display screen such as a liquid crystal display or an organic EL display, and is configured to display the surrounding image. The display switch 49 is configured to receive a display operation of the surrounding image (namely, an operation to display the surrounding image) performed by the occupant.

Each of the first to fourth control devices 14 to 17 consists of an electronic control unit (ECU) including a CPU, a ROM, a RAM, and the like, and operates as the CPU executes arithmetic processing according to a program.

The first control device 14 is connected to the powertrain 4, the brake device 5, the steering device 6, the driving operation element 7, the vehicle sensor 8, the navigation device 9, the shock absorbing device 10, the HMI 13, and the like via a communication network such as a Controller Area Network (CAN).

The first control device 14 is configured to execute automatic driving control of the vehicle 2. When executing the automatic driving control, the first control device 14 controls at least one of the powertrain 4, the brake device 5, and the steering device 6 regardless of an operation on the driving operation element 7 by the occupant. For example, the automatic driving control executed by the first control device 14 includes Minimal Risk Maneuver (MRM), Side Collision Mitigation (SCM), Road Departure Mitigation (RDM), and Auto Lane Change (ALC). MRM is the control to move the vehicle 2 to a safe place and to cause an emergency stop of the vehicle 2 while degenerating the automatic driving control in a case where the occupant does not respond to the driving change request from the first control device 14. SCM is the control to move the vehicle 2 in a direction to avoid or mitigate the vehicle collision in a case where the object outside the vehicle 2 is detected approaching the side of the vehicle 2. RDM is the control to move the vehicle 2 in a direction to avoid or mitigate departure (deviation) of the vehicle 2 from a travel lane in a case where the departure of the vehicle 2 from the travel lane is detected or estimated. ALC is the control to automatically change lanes.

The first control device 14 is configured to execute manual driving control of the vehicle 2. When executing the manual driving control, the first control device 14 controls the powertrain 4, the brake device 5, and the steering device 6 according to the operation on the driving operation element 7 by the occupant. For example, when executing the manual driving control, the first control device 14 controls the powertrain 4 according to a signal from an accelerator pedal sensor configured to detect a pressing amount of the accelerator pedal 27, controls the brake device 5 according to a signal from a brake pedal sensor configured to detect a pressing amount of the brake pedal 28, and controls the steering device 6 according to a signal from a turning angle sensor configured to detect a turning angle of the steering wheel 26. In another embodiment, a control device configured to execute the manual driving control of the vehicle 2 may be separate from a control device configured to execute the automatic driving control of the vehicle 2.

The second control device 15 is connected to the radars 43 via the communication network. The second control device 15 receives detection signals from the radars 43 and thus integrates the received detection signals, thereby recognizing the position of the object outside the vehicle 2. The second control device 15 is connected to the first control device 14 via the communication network.

The third control device 16 is connected to the lidars 44 via the communication network. The third control device 16 receives detection signals from the lidars 44 and thus integrates the received detection signals, thereby recognizing the position of the object outside the vehicle 2. The third control device 16 is connected to the first control device 14 via the communication network.

The fourth control device 17 (an example of a communication device) is connected to the powertrain 4, the brake device 5, the steering device 6, the driving operation element 7, the vehicle sensor 8, the navigation device 9, the shock absorbing device 10, the HMI 13, the first control device 14, and the like via the communication network. The fourth control device 17 is connected to the image capturing device 45 via a digital communication line. The fourth control device 17 is configured to receive the surrounding image from the image capturing device 45 and to integrate the received surrounding image. The fourth control device 17 is connected to the display device 48 via a digital communication line, and is configured to transmit the integrated surrounding image to the display device 48.

The fourth control device 17 is configured to execute automatic parking control of the vehicle 2. When executing the automatic parking control, the fourth control device 17 controls the powertrain 4, the brake device 5, and the steering device 6 regardless of the operation on the driving operation element 7 by the occupant, thereby automatically moving the vehicle 2 to a prescribed target parking position and to stop the vehicle 2 there.

Each of the first and second power supply devices 19 and 20 includes a power supply circuit and a battery. The first power supply device 19 is connected to the first control device 14, the third control device 16, and the fourth control device 17, and is configured to supply electric power to the first control device 14, the third control device 16, and the fourth control device 17. The second power supply device 20 is connected to the second control device 15, and is configured to supply electric power to the second control device 15.

The recording device 21 consists of an electronic control unit (ECU) including a CPU, a ROM, a RAM, and the like, and operates as the CPU executes arithmetic processing according to a program. The recording device 21 is connected to the fourth control device 17 via an analog communication line, and is configured to receive the surrounding image from the fourth control device 17. The recording device 21 is connected to the first control device 14 via the communication network and the fourth control device 17, and is configured to receive a recording request signal from the first control device 14. The recording device 21 is configured to record the surrounding image received from the fourth control device 17 in files for each time range in which the surrounding image is captured and to store the surrounding image in an inside area of the recording device 21 according to the recording request signal from the first control device 14. For example, while receiving the recording request signal from the first control device 14, the recording device 21 continuously (constantly) records the surrounding image received from the fourth control device 17 in the files and stores the surrounding image in the inside area of the recording device 21.

By the way, in the present embodiment, the display device 48 is connected to the fourth control device 17 via the digital communication line, the recording device 21 is connected to the fourth control device 17 via the analog communication line, and the fourth control device 17 is configured to selectively transmit the surrounding image to one of the display device 48 and the recording device 21. According to this arrangement, it is possible to transmit the surrounding image to the display device 48 and the recording device 21 by using a simple configuration.

On the other hand, if such a configuration is adopted, the display of the surrounding image by the display device 48 and the recording of the surrounding image by the recording device 21 are selectively executed. Accordingly, if the recording device 21 records the surrounding image unlimitedly, the display of the surrounding image by the display device 48 may be prevented by the recording of the surrounding image by the recording device 21, and thus the occupant may not be able to check the surrounding situation of the vehicle 2 based on the surrounding image displayed on the display device 48. In the present embodiment, such a problem is solved by executing the undermentioned recording control of the surrounding image.

<The Recording Control of the Surrounding Image>

With reference to FIG. 1, the first control device 14 includes functional components such as a first determining unit 51, a second determining unit 52, and a transmitting unit 53.

Figure 2:
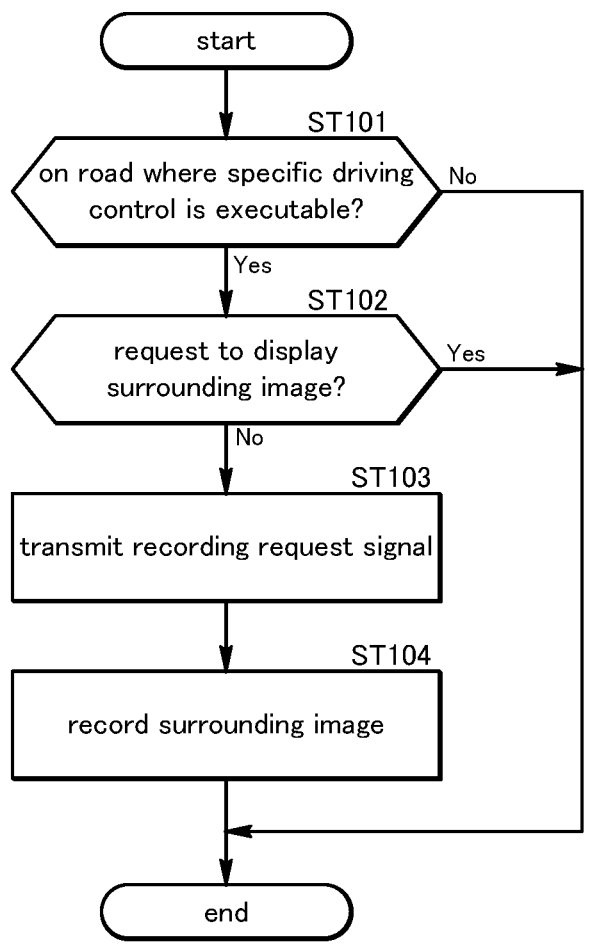
FIG. 2 is a flowchart showing recording control of a surrounding image.

With reference to FIG. 2, when the recording control of the surrounding image is started, the first determining unit 51 determines whether the vehicle 2 is present on a road where specific automatic driving control (hereinafter abbreviated as "specific driving control") is executable based on a signal (more specifically, a signal related to the current position of the vehicle 2 and the map information) from the navigation device 9 (step ST101). The specific driving control is the automatic driving control with a relatively high level of automation. For example, the specific driving control includes lane keeping control and overtaking control (which includes lane changing control) in a state where the occupant releases his/her hands from the steering wheel 26, and preceding vehicle following control in a state where the occupant does not monitor the surroundings of the vehicle 2. The first determining unit 51 determines that the vehicle 2 is present on the road where the specific driving control is executable in a case where the vehicle 2 is present in a main lane of an exclusive road for automobiles (for example, an expressway), and the first determining unit 51 determines that the vehicle 2 is not present on the road where the specific driving control is executable in a case where the vehicle 2 is not present in the main lane of the exclusive road for automobiles.

In a case where the determination in step ST101 is No (in a case where the first determining unit 51 determines that the vehicle 2 is not present on the road where the specific driving control is executable), the transmitting unit 53 does not transmit the recording request signal to the recording device 21, and thus the recording control of the surrounding image ends without the recording of the surrounding image by the recording device 21.

On the other hand, in a case where the determination in step ST101 is Yes (in a case where the first determining unit 51 determines that the vehicle 2 is present on the road where the specific driving control is executable), the second determining unit 52 determines whether a request to display the surrounding image on the display device 48 is present (step ST102). The second determining unit 52 determines that the request to display the surrounding image on the display device 48 is present in a case where the shift range of the vehicle 2 is set to the reverse range, and the second determining unit 52 determines that the request to display the surrounding image on the display device 48 is absent in a case where the shift range of the vehicle 2 is not set to the reverse range. In another embodiment, the second determining unit 52 may determine that the request to display the surrounding image on the display device 48 is present in a case where the display switch 49 receives the display operation of the surrounding image, and the second determining unit 52 may determine that the request to display the surrounding image on the display device 48 is absent in a case where the display switch 49 does not receive the display operation of the surrounding image.

In a case where the determination in step ST102 is Yes (in a case where the second determining unit 52 determines that the request to display the surrounding image on the display device 48 is present), the transmitting unit 53 does not transmit the recording request signal to the recording device 21, and thus the recording control of the surrounding image ends without the recording of the surrounding image by the recording device 21.

On the other hand, in a case where the determination in step ST102 is No (in a case where the second determining unit 52 determines that the request to display the surrounding image on the display device 48 is absent), the transmitting unit 53 transmits the recording request signal to the recording device 21 (step ST103).

Upon receiving the recording request signal from the transmitting unit 53, the recording device 21 records the surrounding image in files (step ST104). Accordingly, the recording control of the surrounding image ends. The above-mentioned recording control of the surrounding image is repeated every regular time period.

As described above, in a case where the first determining unit 51 determines that the vehicle 2 is present on the road where the specific driving control is executable and the second determining unit 52 determines that the request to display the surrounding image on the display device 48 is absent, the recording device 21 records the surrounding image. Thus, it is possible to record the surrounding image at an appropriate timing without preventing the display device 48 from displaying the surrounding image.

Further, in a case where the first determining unit 51 determines that the vehicle 2 is present on the road where the specific driving control is executable and the second determining unit 52 determines that the request to display the surrounding image on the display device 48 is absent, the recording device 21 records the surrounding image regardless of whether the specific driving control is being executed. Thus, it is possible to record not only the surrounding image captured during the specific driving control but also the surrounding image captured before the start of and after the end of the specific driving control. Accordingly, it is possible to easily identify the cause of the event that has occurred before the start of and after the end of the specific driving control.

Further, the first determining unit 51 determines that the vehicle 2 is present on the road where the specific driving control is executable in a case where the vehicle 2 is present in the main lane of the exclusive road for automobiles, and the first determining unit 51 determines that the vehicle 2 is not present on the road where the specific driving control is executable in a case where the vehicle 2 is not present in the main lane of the exclusive road for automobiles. Thus, the surrounding image can be recorded in a case where the specific driving control is executed in the main lane of the exclusive road for automobiles.

Further, the second determining unit 52 determines that the request to display the surrounding image on the display device 48 is present in a case where the shift range of the vehicle 2 is set to the reverse range, and the second determining unit 52 determines that the request to display the surrounding image on the display device 48 is absent in a case where the shift range of the vehicle 2 is not set to the reverse range. Thus, the recording device 21 can stop recording the surrounding image and the display device 48 can display the surrounding image in a state where the shift range of the vehicle 2 is set to the reverse range. Accordingly, the occupant can easily check the surrounding situation of the vehicle 2 based on the surrounding image when the vehicle 2 reverses.

In a state where an ignition of the vehicle 2 is ON, the first control device 14 and the second control device 15 record the vehicle data (for example, the data of the vehicle states detected by the vehicle sensor 8 and internal variables of the vehicle control system 1) in inside areas of the first control device 14 and the second control device 15 regardless of determination results of the first determining unit 51 and the second determining unit 52. Namely, even when the vehicle 2 is not present on the main lane of the exclusive road for automobiles and even when the shift range of the vehicle 2 is set to the reverse range, the first control device 14 and the second control device 15 record the vehicle data in the inside areas thereof. Thus, the first control device 14 and the second control device 15 can record the vehicle data even when the recording device 21 is not recording the surrounding image. Accordingly, it is possible to easily identify the cause of the event that has occurred in a state where the recording device 21 is not recording the surrounding image.

Figure 3:
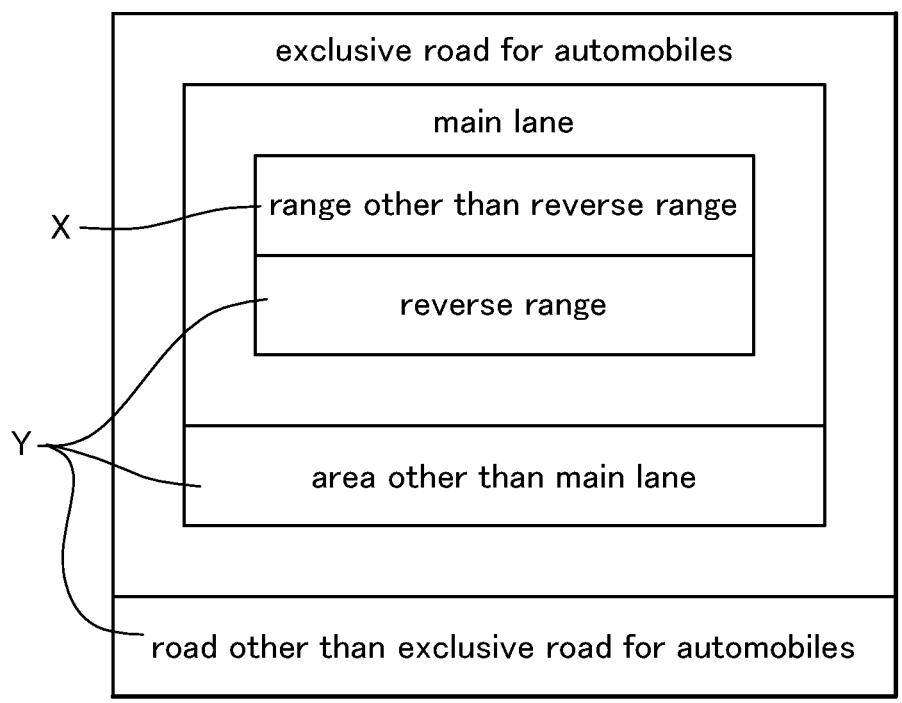
FIG. 3 is an explanatory diagram showing the areas where a recording device records the surrounding image and the areas where the recording device does not record the surrounding image.

As a result of the above-mentioned recording control of the surrounding image, as shown in FIG. 3, the recording device 21 records the surrounding image in a case where the vehicle 2 is present on the main lane of the exclusive road for automobiles and the shift range of the vehicle 2 is set to a range other than the reverse range (for example, the forward range, the neutral range, or the parking range). On the other hand, the recording device 21 does not record the surrounding image in a case where the vehicle 2 is present in an area other than the main lane (for example, a merging point to the main lane, a diverging point from the main lane, or an area around a tollgate) of the exclusive road for automobiles, in a case where the vehicle 2 is present on a road other than the exclusive road for automobiles (for example, a rest area, a parking area, or a city road), and in a case where the shift range of the vehicle 2 is set to the reverse range.

For example, the display switch 49 may receive the display operation of the surrounding image in a state where the vehicle 2 stops in the main lane of the exclusive road for automobiles and the shift range of the vehicle 2 is set to the range other than the reverse range. In such a case, the display device 48 does not display the surrounding image but displays an error message indicating that the surrounding image cannot be displayed since the recording device 21 is recording the surrounding image. In this way, in a case where the vehicle 2 is present on the main lane of the exclusive road for automobiles and the shift range of the vehicle 2 is set to the range other than the reverse range, the display device 48 does not display the surrounding image and the recording device 21 keeps on recording the surrounding image even if the display switch 49 receives the display operation of the surrounding image.

In this way, there is a case where the display device 48 does not display the surrounding image even if the display switch 49 receives the display operation of the surrounding image. In the following, display control of the surrounding image will be described. The display control of the surrounding image is executed for determining whether the display device 48 displays the surrounding image in a case where the display switch 49 receives the display operation of the surrounding image.

<The Display Control of the Surrounding Image>

With reference to FIG. 4, when the display switch 49 receives the display operation of the surrounding image (step ST201), the fourth control device 17 determines whether the recording device 21 is recording the surrounding image (step ST202).

In a case where the determination in step ST202 is Yes (in a case where the fourth control device 17 determines that the recording device 21 is recording the surrounding image), the fourth control device 17 transmits a creation instructing signal of the error message (namely, a signal instructing creation of the error message) to the display device 48 without creating the error message by itself (step ST203). Upon receiving the creation instructing signal of the error message, the display device 48 creates the error message (hereinafter referred to as "first error message") such as "The surrounding image cannot be displayed because the vehicle is traveling in the main lane of the exclusive road for automobiles. When the vehicle leaves the main lane of the exclusive road for automobiles, the surrounding image will be displayed." (step ST204). Next, the display device 48 superimposes the created first error message on an image (namely, composites an image by using the created first error message), and thus displays this image (step ST205).

On the other hand, in a case where the determination in step ST202 is No (in a case where the fourth control device 17 determines that the recording device 21 is not recording the surrounding image), the fourth control device 17 determines whether the vehicle speed is equal to or more than a prescribed display speed limit based on a signal from the vehicle speed sensor 31 (step ST206).

In a case where the determination in step ST206 is Yes (in a case where the fourth control device 17 determines that the vehicle speed is equal to or more than the display speed limit), the fourth control device 17 creates an error message (hereinafter referred to as "second error message") such as "The vehicle speed is too high to display the surrounding image. When the vehicle speed decreases, the surrounding image will be displayed." (step ST207). Next, the fourth control device 17 superimposes the created second error message on an image (namely, composites an image by using the created second error message), and thus transmits the image on which the second error message is superimposed to the display device 48 (step ST208). When the display device 48 receives the image on which the second error message is superimposed, the display device 48 displays this image (step ST209).

On the other hand, in a case where the determination in step ST206 is No (in a case where the fourth control device 17 determines that the vehicle speed is less than the display speed limit), the display device 48 displays the surrounding image (step ST210). Accordingly, the display control of the surrounding image ends.

As described above, in a case where the display switch 49 receives the display operation, the display device 48 displays the surrounding image on condition that the vehicle speed is less than the display speed limit and the recording device 21 is not recording the surrounding image. On the other hand, in a case where the display switch 49 receives the display operation, the display device 48 displays the error message indicating that the surrounding image cannot be displayed on condition that the vehicle speed is equal to or more than the display speed limit or the recording device 21 is recording the surrounding image. Thus, the display device 48 can display the surrounding image at an appropriate timing. Also, in a case where the surrounding image cannot be displayed, it is possible to inform the occupant so.

Further, in a case where the display switch 49 receives the display operation, the display device 48 creates the first error message regardless of the vehicle speed on condition that the recording device 21 is recording the surrounding image. Further, in a case where the display switch 49 receives the display operation, the fourth control device 17 creates the second error message on condition that the recording device 21 is not recording the surrounding image and the vehicle speed is equal to or more than the display speed limit. Accordingly, in a case where the recording device 21 records the surrounding image received from the fourth control device 17, it is possible to prevent the error message created by the fourth control device 17 from appearing on the surrounding image recorded by the recording device 21. Accordingly, it is possible to easily identify the cause of the event that has occurred with regard to the vehicle 2 based on the surrounding image.

Concrete embodiments of the present invention have been described in the foregoing, but the present invention should not be limited by the foregoing embodiments and various modifications and alterations are possible within the scope of the present invention.

The invention claimed is:

1. A vehicle control system, comprising:
a control device configured to execute specific automatic driving control of a vehicle;
an image capturing device configured to capture a surrounding image of the vehicle;
a display device configured to display the surrounding image; and
a recording device configured to record the surrounding image,
wherein the control device includes:
a first determining unit configured to determine whether the vehicle is present on a road where the specific automatic driving control is executable; and
a second determining unit configured to determine whether a request to display the surrounding image on the display device is present, and
in a case where the first determining unit determines that the vehicle is present on the road where the specific automatic driving control is executable and the second determining unit determines that the request to display the surrounding image on the display device is absent, the recording device records the surrounding image.

2. The vehicle control system according to claim 1, wherein in a case where the first determining unit determines that the vehicle is present on the road where the specific automatic driving control is executable and the second determining unit determines that the request to display the surrounding image on the display device is absent, the recording device records the surrounding image regardless of whether the specific automatic driving control is being executed.

3. The vehicle control system according to claim 1, wherein in a case where the vehicle is present in a main lane of an exclusive road for automobiles, the first determining unit determines that the vehicle is present on the road where the specific automatic driving control is executable, and
in a case where the vehicle is not present in the main lane of the exclusive road for the automobiles, the first determining unit determines that the vehicle is not present on the road where the specific automatic driving control is executable.

4. The vehicle control system according to claim 3, wherein in a case where a shift range of the vehicle is set to a reverse range, the second determining unit determines that the request to display the surrounding image on the display device is present, and
in a case where the shift range of the vehicle is not set to the reverse range, the second determining unit determines that the request to display the surrounding image on the display device is absent.

5. The vehicle control system according to claim 1, further comprising a communication device configured to receive the surrounding image from the image capturing device and to transmit the received surrounding image to the display device,
wherein the recording device is configured to record the surrounding image received from the communication device.

6. The vehicle control system according to claim 5, further comprising a display switch configured to receive a display operation of the surrounding image, wherein in a case where the display switch receives the display operation, the display device displays the surrounding image on condition that a vehicle speed is less than a prescribed display speed limit and the recording device is not recording the surrounding image, and in the case where the display switch receives the display operation, the display device displays an error message indicating that the surrounding image cannot be displayed on condition that the vehicle speed is equal to or more than the display speed limit or the recording device is recording the surrounding image.

7. The vehicle control system according to claim 6, wherein in the case where the display switch receives the display operation, the communication device creates the error message on condition that the vehicle speed is equal to or more than the display speed limit, and in the case where the display switch receives the display operation, the display device creates the error message on condition that the recording device is recording the surrounding image.

8. The vehicle control system according to claim 5, wherein the display device is connected to the communication device via a digital communication line, the recording device is connected to the communication device via an analog communication line, and the communication device is configured to selectively transmit the surrounding image to one of the display device and the recording device.

9. The vehicle control system according to claim 1, further comprising a vehicle sensor configured to detect a vehicle state, wherein the control device is configured to record vehicle data in an inside area thereof regardless of determination results of the first determining unit and the second determining unit, the vehicle data including the vehicle state.

10. The vehicle control system according to claim 1, wherein the image capturing device includes plural cameras configured to capture images of a front side, a rear side, a left side, and a right side of the vehicle, respectively.

* * * * *